2,798,459
SHEARING MACHINE WITH AUTOMATIC RETURN

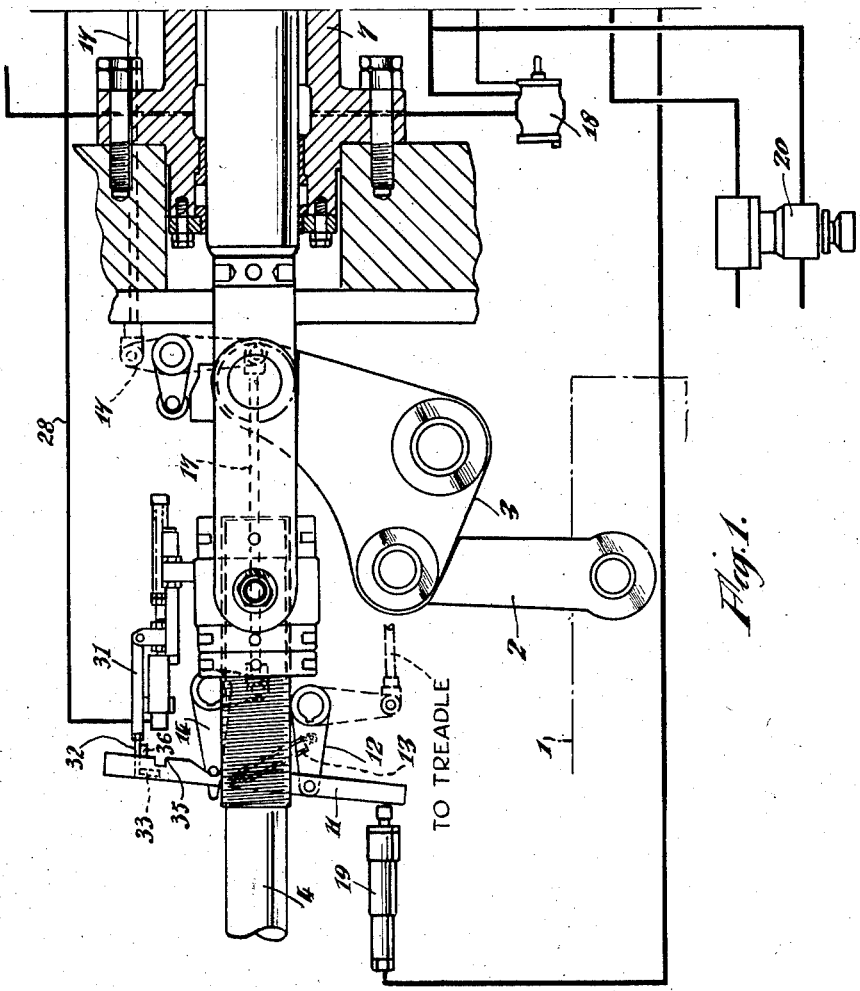

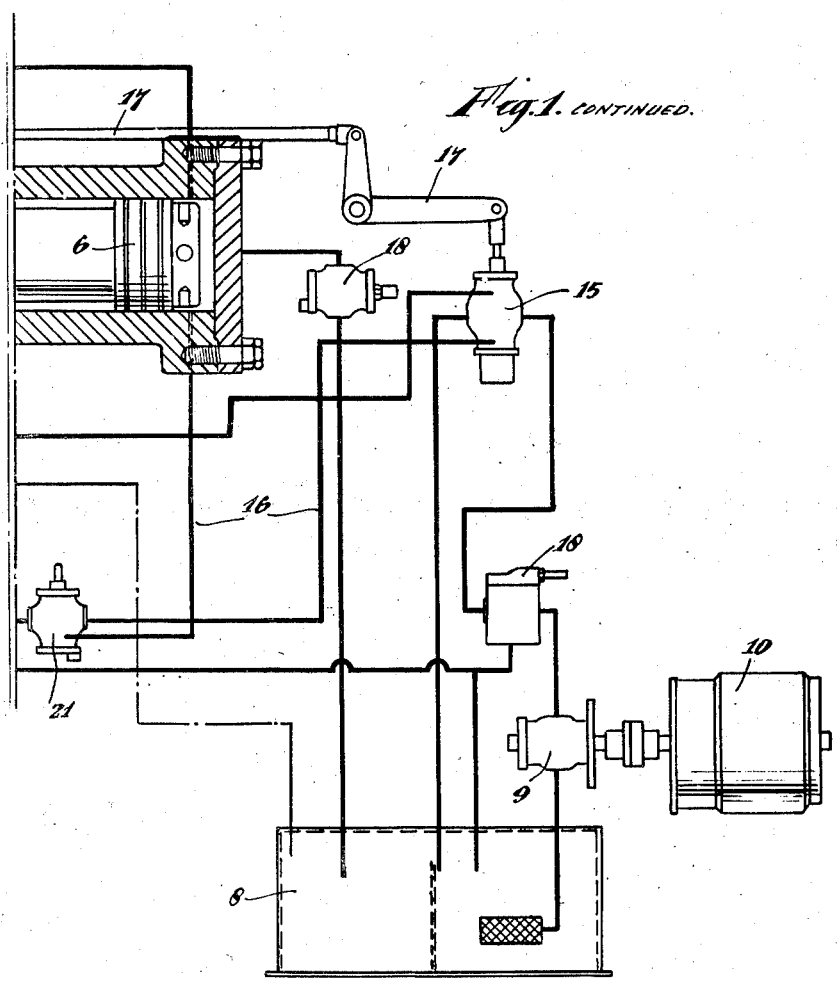

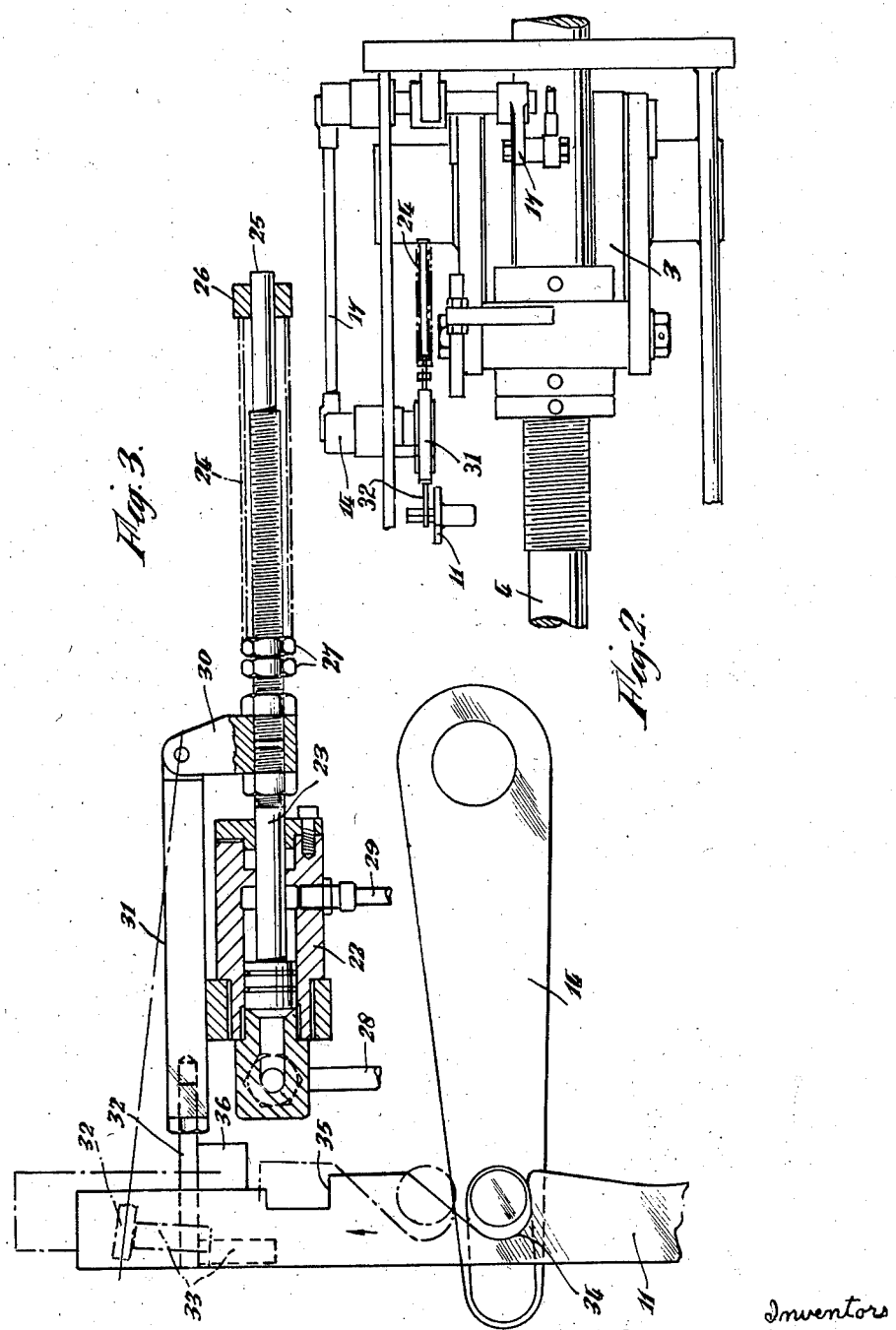

Charles Joseph Rhodes, Wakefield, and Harry Ridgway, Sandal, Wakefield, England

Application October 7, 1955, Serial No. 539,205

Claims priority, application Great Britain October 19, 1954

4 Claims. (Cl. 121—38)

This invention relates to machines for cutting or shearing sheets or plates in which the working and return strokes of a reciprocable tool carrying beam or member are effected by hydraulic pressure.

Machines of this type normally have a full working stroke so long as the control element, such as a foot treadle is held in its operative position. Thus if a strip or relatively narrow plate or sheet be fed to the tool the latter will finish its full stroke after the shearing operation and this often wastes working time. The only way to obviate this hitherto has been for the operator to be fully conversant with the machine and alert to the fact that he should release the control element part way through the operative stroke at the finish of the cutting action.

It is the main object of this invention to obviate the above difficulty and cause automatic return of the tool immediately after the shearing action.

Accordingly a machine of the above type is provided with hydraulic control means for the tool-carrying beam and connected to the tool operating hydraulic system so as to be operated in one direction automatically by a build-up of hydraulic pressure on the commencement of the shearing action, and given a return operation when said pressure drops immediately on the termination of such shearing action so as to control the tool operating hydraulic system, whereby the tool is returned automatically to its inoperative position immediately after its shearing action.

The hydraulic control means may comprise a hydraulic plunger spring loaded in one direction and operated in the other direction by hydraulic pressure from the main cylinder operating the shearing tool, said plunger being operably connected to a pivoted member adapted to automatically engage a pivoted knock-off latch mechanically operated by the machine control element, such as a foot treadle, the arrangement being that hydraulic pressure forces the pivoted member away from the latch to move into an operative position and the spring loading provides an operative action for moving the latch for causing the return stroke of the shearing tool.

The term "hydraulic plunger" as used herein is generically intended to include a piston or equivalent pressure operable device.

Referring now to the accompanying drawings in which an embodiment of the invention is shown:

Fig. 1 is a general arrangement of the hydraulic operating cylinder and system of a shearing machine and including the improved control means;

Fig. 2 is a part plan view of the control means; and

Fig. 3 is an enlarged detail view of the control means.

The cutting or shearing machine is of the type generally described in the specification of British Patent No. 556,836, in which a tool-carrying beam 1 is raised and lowered equally each end by linkages 2, 3 connected with a common rod 4 running parallel with the beam and slidable in fixed guides not shown carried by the main frame. Such rod is operated by a piston 6 working in a double-ended main hydraulic cylinder 7 which receives pressurized liquid from a tank 8 through a pump 9 driven by an electric motor 10. Hydraulic pressure supplied to one end of the piston causes the working stroke of the shearing tool as soon as a foot treadle, not shown, is operated to raise a knock-off latch 11 through a bell crank lever 12 about which the latch can pivot and a spring 13 extends between the latch and lever. Upward movement of the latch causes a bell crank lever 14 to turn about its pivot and open a main four-way control valve 15 in the hydraulic pressure system 16 by means of connections 17. This system is furnished with various valves 18 and so arranged that at the end of its full working stroke the tool automatically returns to its inoperative position. This machine also includes an overload release device 19 of the type disclosed in the specification of British Patent No. 706,320, such device acting on the lower end of the pivoted patch 11. Hydraulic devices 20 for holding down material being sheared are provided with a control valve 21 in the system.

The control device according to this invention comprises an auxiliary hydraulic knock-off cylinder 22 furnished with a plunger 23 (or piston) which is spring loaded, by a compression spring 24, in opposition to the hydraulic pressure. The spring 24 is located on a plunger extension rod 25 which is slidable through a fixed stop 26 against which the spring bears. The other end of the spring bears against nuts 27 to thrust the plunger to its normal position. The cylinder is connected by a pipeline 28 to the main operating cylinder 7 of the machine and provided with a drain connection 29 to the supply tank 8. The said plunger rod 25 carries a bracket 30 to which a swivel finger 31 is pivoted to lie above the cylinder 22 and furnished with an extension 32 normally lying on a projection 33 carried by the treadle latch. Due to this position, when the latch 11 is raised by operation of the treadle, the swivel finger and its extension are also lifted into a raised position at an angle and the arrangement is that when hydraulic pressure is admitted to the cylinder 22 the extension 32 will be drawn back sufficiently to allow the swivel finger 31 to fall and the extension to become located behind the projection 33, the latch 11 in this position acting as a retainer, through notch 34, for the bell crank lever 14 controlling the valve 15 of the main machine cylinder 7.

The operation of the improved device is that on the treadle being operated for the tool to shear through a sheet or plate narrower in width than the full length of the shearing tool, the treadle latch 11 is lifted and hooked, through the medium of notch 35, onto a fixed latch stop 36 for opening and holding open the main control valve 15 as hitherto and at the same time this movement raises the swivel finger 31 due to the extension 32 thereof resting on the latch projection 33. Through the usual valve gear, hydraulic pressure has now been built up in the piston end of the main and knock-off cylinders 7 and 22 and the beam can commence to descend. When the tool, not shown, carried by beam 1 contacts the material to be cut the hydraulic pressure is increased to maximum cutting pressure and such pressure is then sufficient to actuate the plunger 23 against the action of its spring 24. This plunger movement automatically withdraws the swivel finger and thus its extension 32 which falls down behind the latch projection 33 and rests upon the latch stop 36 or other stop means. When the material has been sheared the oil pressure in the main and knock-off cylinders 7 and 22, respectively is instantly released and the compression spring 24 will return the plunger 23 carrying with it the swivel finger and extension. Thus the latter pushes the treadle latch 11 and trips it from its latch stop 36 thereby allowing the aforesaid bell crank lever 14 to turn and operate its valve 15, whereupon the hydraulic pressure in the system is reversed in the main machine cylinder 7 so that the beam 1 is automatically returned to its inoperative position. The latch 11, being spring loaded at 13, on release of the treadle, returns and ensures that the bell crank lever 14 is engaged in the notch 34 of the latch again ready for another depression of the treadle.

It will be appreciated that any of the required parts of the improved device may be adjustably mounted for setting purposes and the spring is also adjustable by the nuts 27 to set the spring loading.

What we claim is:

1. In a hydraulically-operated shearing machine having a hydraulic system including a main hydraulic cylinder and piston for operating a shearing tool, main valve means for controlling said piston, operating means for said valve means for causing an operating stroke of the tool, and mechanical retaining means for holding the valve means open for the operating stroke, the improvement which resides in an additional hydraulic control device connected to the aforesaid hydraulic system, said device including an operating element adapted to be positioned in operative relation to said mechanical retaining means by a build-up of hydraulic pressure in the system on the commencement of a shearing action of the tool, said pressure acting against another predetermined return pressure adapted to be overcome by said build-up of pressure, the arrangement being such that when a shearing action is completed within the normal full working stroke of the tool, the automatic drop in the built-up pressure causes the pressurized operating element to return to rest and displace the mechanical retaining means to operate the said main valve and thus effect an immediate return stroke of the tool.

2. In a hydraulically operated shearing machine having a hydraulic system including a main hydraulic cylinder and piston for controlling and operating a shearing tool and an operating member associated with said main cylinder for causing an operating stroke of said tool, the improvement which resides in an additional hydraulic control device connected in said hydraulic system, said control device comprising a hydraulic plunger, spring means loading said plunger in one direction, said plunger being operated against the spring loading by a build-up of hydraulic pressure on the commencement of a shearing action of the tool, said operating member being associated with said plunger to be positioned in an operative position by said hydraulic pressure operation, a pivoted member operably connected to said plunger, a pivoted knock-off latch connected to said operating member and engageable by said pivoted member, the arrangement being such that the built-up hydraulic pressure overcomes the spring loading and forces the pivoted member away from the latch into an operative position and on the lowering of hydraulic pressure, the spring loading forces the pivoted member to move the latch and said operating member to effect an immediate return stroke of the tool.

3. Shearing machine according to claim 2, wherein the pivoted member is mounted to rest upon a projection on the latch, is lifted thereby and subsequently is withdrawn by hydraulic pressure to fall behind the projection to move the latch under the influence of the spring loading.

4. Shearing machine according to claim 2, wherein the pivoted member is carried by a part mounted on a rod extending from the plunger, and a compression spring is also mounted on said rod to load the plunger.

References Cited in the file of this patent

UNITED STATES PATENTS

| 2,079,904 | Ernst | May 11, 1937 |
| 2,163,627 | Peterson | June 27, 1939 |
| 2,216,973 | Harrington | Oct. 8, 1940 |